(12) United States Patent
Yoshida et al.

(10) Patent No.: US 10,763,018 B2
(45) Date of Patent: Sep. 1, 2020

(54) CHIP RESISTOR

(71) Applicant: Panasonic Intellectual Property Management Co., Ltd., Osaka (JP)

(72) Inventors: Noritaka Yoshida, Osaka (JP); Kenichi Matsushima, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/468,585

(22) PCT Filed: Mar. 13, 2018

(86) PCT No.: PCT/JP2018/009617
§ 371 (c)(1),
(2) Date: Jun. 11, 2019

(87) PCT Pub. No.: WO2018/190057
PCT Pub. Date: Oct. 18, 2018

(65) Prior Publication Data
US 2020/0090843 A1 Mar. 19, 2020

(30) Foreign Application Priority Data

Apr. 14, 2017 (JP) .................. 2017-080185

(51) Int. Cl.
H01C 17/065 (2006.01)
C03C 8/02 (2006.01)
(Continued)

(52) U.S. Cl.
CPC ......... *H01C 17/06513* (2013.01); *C03C 8/02* (2013.01); *H01C 1/14* (2013.01); *H01C 7/003* (2013.01); *H01C 17/283* (2013.01)

(58) Field of Classification Search
CPC .... H01C 17/06513; H01C 1/14; H01C 7/003; H01C 17/283
See application file for complete search history.

(56) References Cited

U.S. PATENT DOCUMENTS 4,632,846 A 12/1986 Fujinaka et al.
4,651,126 A * 3/1987 Kumar ............... H01C 7/06
252/512

(Continued)

FOREIGN PATENT DOCUMENTS

JP 61-077636 4/1986
JP 4-188603 7/1992
(Continued)

OTHER PUBLICATIONS

International Search Report of PCT application No. PCT/JP2018/009617 dated Jun. 5, 2018.

*Primary Examiner* — Kyung S Lee

(57) ABSTRACT

A chip resistor includes an insulating substrate made of alumina, a pair of electrodes disposed on an upper surface of the insulating substrate, a glass glaze layer made of glass disposed on the upper surface of the insulating substrate, and a resistive element disposed on the upper surface of the glass glaze layer. The resistive element is disposed between the pair of electrodes. The softening point of the glass of the glass glaze layer ranges from 580° C. to 760° C. This chip resistor prevents the resistive element from being peeled off.

8 Claims, 1 Drawing Sheet

(51) Int. Cl.
*H01C 1/14* (2006.01)
*H01C 7/00* (2006.01)
*H01C 17/28* (2006.01)

(56) References Cited

U.S. PATENT DOCUMENTS

| | | | | | |
|---|---|---|---|---|---|
| 4,806,334 | A | * | 2/1989 | Fujinaka | C03C 8/02 |
| | | | | | 174/256 |
| 5,175,527 | A | * | 12/1992 | Ishiguro | G01F 1/684 |
| | | | | | 252/514 |
| 5,907,274 | A | * | 5/1999 | Kimura | H01C 1/142 |
| | | | | | 338/308 |
| 5,998,037 | A | * | 12/1999 | Sridharan | C03C 3/064 |
| | | | | | 427/126.4 |
| 8,994,491 | B2 | * | 3/2015 | Kim | H01C 7/00 |
| | | | | | 338/307 |
| 2010/0032427 | A1 | * | 2/2010 | Aritaki | H05B 3/03 |
| | | | | | 219/546 |
| 2019/0164672 | A1 | * | 5/2019 | Yun | H01C 17/06526 |

FOREIGN PATENT DOCUMENTS

JP 5-148065 6/1993
JP 6-053005 2/1994

\* cited by examiner

| | Bposition of Glass | Softening Point | Adhessiveness |
|---|---|---|---|
| Sample 1 | PbO-$B_2O_3$-$SiO_2$ Based | 490 °C | Liquid Melt Flows |
| Sample2 | $SiO_2$-$B_2O_3$-ZnO-$R_2O$ Based | 580 °C | Preferable |
| Sample 3 | $SiO_2$-$B_2O_3$-ZnO-$R_2O$ Based | 630 °C | Preferable |
| Sample 4 | $SiO_2$-$B_2O_3$-$R_2O$ Based | 760 °C | Preferable |
| Sample 5 | $SiO_2$-CaO-BaO Based | 840 °C | Preferable |

CHIP RESISTOR

CROSS-REFERENCE TO RELATED APPLICATIONS

This application is a U.S. national stage application of the PCT international application No. PCT/JP2018/009617 filed on Mar. 13, 2018, which claims the benefit of foreign priority of Japanese patent application No. 2017-080185 filed on Apr. 14, 2017, the contents all of which are incorporated herein by reference.

TECHNICAL FIELD

The present invention relates to a chip resistor.

BACKGROUND ART

A conventional chip resistor disclosed in PTL 1 includes an insulating substrate made of alumina, a glass layer disposed on a central portion of an upper surface of the insulating substrate, a pair of electrodes disposed at opposite ends of the upper surface of the insulating substrate, and a resistive element disposed on an upper surface of the glass layer and between the pair of electrodes. In this chip resistor, the resistive element may be peeled off from the glass layer when the resistive element is fired.

CITATION LIST

Patent Literature

PTL 1: Japanese Patent Laid-Open Publication No. 06-53005

SUMMARY

A chip resistor includes an insulating substrate made of alumina, a pair of electrodes disposed on an upper surface of the insulating substrate, a glass glaze layer disposed on the upper surface of the insulating substrate made of glass, and a resistive element disposed on an upper surface of the glass glaze layer. The resistive element is provided between the pair of electrodes. The softening point of the glass of the glass glaze layer ranges from 580° C. to 760° C.

This chip resistor prevents the resistive element from being peeled off.

DETAIL DESCRIPTION OF PREFERRED EMBODIMENT

Figures 1, 2:
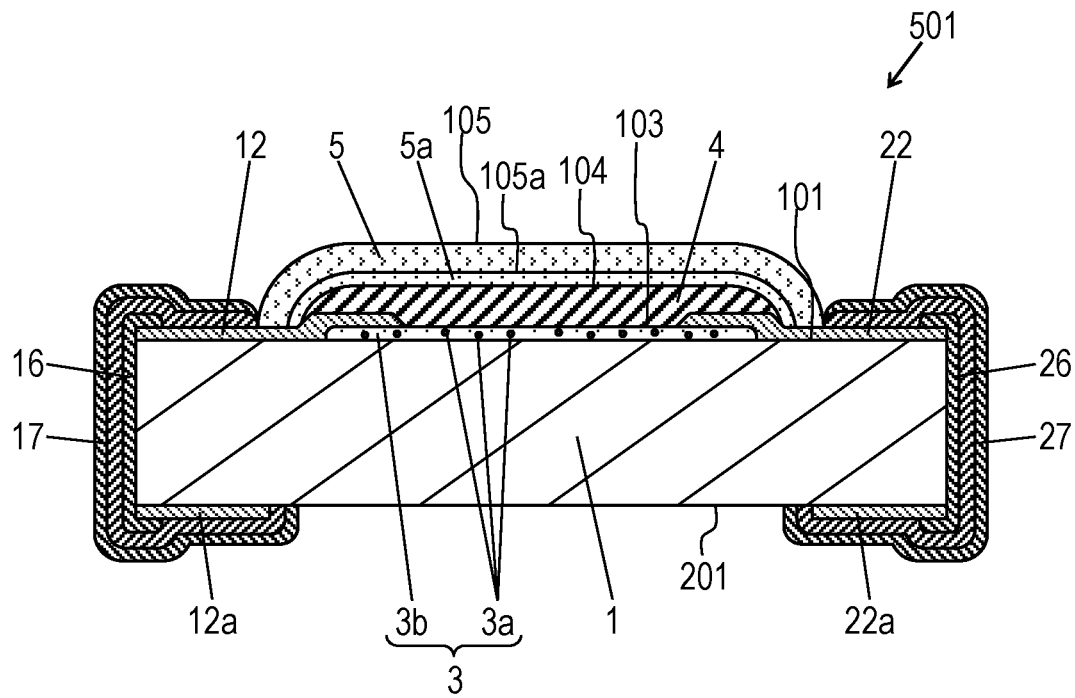
FIG. 1 is a sectional view of a chip resistor in accordance with an exemplary embodiment.
FIG. 2 shows the relationship between the softening point of glass of a glass glaze layer of the chip resistor and the adhesiveness of a resistive element in accordance with the embodiment.

FIG. 1 is a sectional view of chip resistor 501 in accordance with an exemplary embodiment. Chip resistor 501 includes insulating substrate 1 made of alumina, a pair of electrodes 12 and 22 disposed at opposite ends of upper surface 101 of insulating substrate 1, glass glaze layer 3 disposed on a central portion of upper surface 101 of insulating substrate 1, resistive element 4 disposed on an upper surface of glass glaze layer 3, protective film 5 covering resistive element 4 and electrodes 12 and 22, a pair of end-surface electrodes 16 and 26 disposed on opposite end surfaces of insulating substrate 1, and plated layers 17 and 27 which are formed on the surfaces of end-surface electrodes 16 and 26, respectively. Resistive element 4 is provided between the pair of electrodes 12 and 22 and is connected to electrodes 12 and 22. End-surface electrodes 16 and 26 are electrically connected to the pair of electrodes 12 and 22, respectively.

Insulating substrate 1 is made of alumina ($Al_2O_3$), and has a rectangular shape.

The pair of electrodes 12 and 22 is produced by printing and firing a thick-film material made of silver, silver-palladium, or copper on upper surface 101 of insulating substrate 1. A pair of lower-surface electrodes 12a and 22a may be formed at opposite ends of lower surface 201 of insulating substrate 1.

Glass glaze layer 3 is made of glass 3a and filler 3b dispersed in glass 3a, and is disposed on a central portion of upper surface 101 of insulating substrate 1. The thickness of glass glaze layer 3 is equal to or larger than 5 μm or more.

Glass glaze layer 3 may be formed on the entire of upper surface 101 of insulating substrate 1. Glass glaze layer 3 may not necessarily overlap the pair of electrodes 12 and 22.

The softening point of glass 3a ranges from 580° C. to 760° C. Glass 3a may be preferably made of $SiO_2$—$B_2O_3$—ZnO—$R_2O$ based glass or $SiO_2$—$B_2O_3$—$R_2O$ based glass that contains alkali metal oxide $R_2O$.

Filler 3b is preferably made of alumina powder so as to cause the thermal expansion coefficient of glass glaze layer 3 to be close to that of insulating substrate 1. The content of filler 3b preferably at ranges from 15 vol % to 40 vol % of the entire of glass glaze layer 3.

Resistive element 4 is disposed on upper surface 103 of glass glaze layer 3, and is provided between the pair of electrodes 12 and 22. Resistive element 4 is made of CuNi, and is produced by printing a resistive paste containing CuNi plural times and firing the paste at 950° C. in a nitrogen atmosphere. In order to decrease the resistance value of the resistive element 4, the thickness of resistive element 4 is equal to or larger than 50 μm.

Protective glass layer 5a covering resistive element 4 is made of pre-coated glass. The chip resistor may not necessarily include protective glass layer 5a. Furthermore, in resistive element 4 may have a trimming groove provided therein for adjusting the resistance value of resistive element 4.

Protective film 5 is disposed on upper surface 105a of protective glass layer 5a, and is made of a thick-film material made of glass or epoxy resin so as to cover resistive element 4 and a part of the pair of electrodes 12 and 22.

The pair of end-surface electrodes 16 and 26 is disposed on opposite ends of insulating substrate 1, and is produced by printing a material made of Ag and resin so as to electrically be connected to portions of electrodes 12 and 22 exposed from protective film 5, respectively. Plated layers 17 and 27 each including a nickel-plated layer and a tin-plated layer are disposed on the surfaces of the pair of end-surface electrodes 16 and 26, respectively.

In accordance with the embodiment, the softening point of glass 3a is equal to or higher than 580° C., so that glass glaze layer 3 may be prevented from flowing and expanding beyond the original pattern. The softening point of glass 3a is equal to or lower than 760° C., so that resistive element 4 may be prevented from peeling off from insulating substrate 1.

In other words, by glass glaze layer 3 on the lower surface of resistive element 4 is softened during the firing of resistive element 4, and the entire of the lower surface of resistive element 4 firmly fuses with insulating substrate 1. Therefore, the entire of resistive element 4 is not peeled off from insulating substrate 1. Glass glaze layer 3 including glass 3a and filler 3b suppresses the change in the shape of resistive element 4 during the firing of resistive element 4.

When the softening point of glass 3a is lower than 580° C., the glass melts to have an excessively small viscosity during the printing and firing of glass glaze layer 3. Therefore, glass glaze layer 3 flows and expands beyond the original pattern. Upon flowing on the entire surface of insulating substrate 1, the liquid melt of glass 3a of glass glaze layer 3 prevents the shapes of glass glaze layer 3 and resistive element 4 from being stabilized, thereby providing a poor appearance.

In the case that the softening point of glass 3a is higher than 760° C., the viscosity of glass 3a melting beyond the softening point is excessively high. Therefore, the entire of the lower surface of resistive element 4 may not be wetted sufficiently. Thus, the entire of the lower surface of resistive element 4 may not be firmly fused with insulating substrate 1. As a result, resistive element 4 may be peeled off.

In the case that resistive element 4 is thick to have a small resistance value, a large force for shrinking resistive element 4 in a plane direction parallel with upper surface 101 of insulating substrate 1 maybe applied to resistive element 4. Even when the force for shrinking resistive element 4 in the plane direction is increased, as discussed above, resistive element 4 can be prevented from being peeled off by allowing the softening point of glass 3a of glass glaze layer 3 to range from 580° C. to 760° C.

The thickness of a resistive element of a thick-film chip resistor generally ranges from 10 μm to 20 μm. In the case that the thickness of the resistive element is large to decrease the resistance value and is especially equal to or larger than 50 μm, however, the shrinking force that shrinks the resistive element in the plane direction increases accordingly. The adhesion between the resistive element and the insulating substrate may not withstand the shrinking force, and the edge of the resistive element may be raised up and peeled off from the glass layer after the firing of the resistive element.

Even in the case that a glass layer is disposed below the resistive element so as to keep the adhesiveness between the resistive element and the insulating substrate, the following problem occurs. In the case that the softening point of the glass contained in the glass layer is excessively low, the viscosity of the melting glass excessively decreases during the firing of a previously printed glass paste. Then the glass flows so that the glass layer expands beyond the original print pattern.

Conversely, in the case that the softening point of the glass is excessively high, the following problem occurs. The viscosity of the glass melting beyond the softening point is excessively high, so that the entire of the lower surface of the resistive element may not be wetted sufficiently. The entire of the lower surface of the resistive element may not thus be firmly fused with the insulating substrate made of alumina, hence causing the resistive element to be peeled off.

FIG. 2 shows the relationship between the compositions and softening points of samples 1-5 of glass 3a constituting glass glaze layer 3 and the adhesiveness of resistive element 4 of chip resistor 501 in accordance with the embodiment. Sample 1 of glass 3a is made of $PbO$—$B_2O_3$—$SiO_2$ based glass. Samples 2 and 3 of glasses 3a are made of $SiO_2$—$B_2O_3$—$ZnO$—$R_2O$ based glass containing alkali metal oxide $R_2O$. Sample 4 of glass 3a is made of $SiO_2$—$B_2O_3$—$R_2O$ based glass containing alkali metal oxide $R_2O$. Sample 5 of glass 3a is made of $SiO_2$—$CaO$—$BaO$ based glass.

Samples 1-5 of glass glaze layers 3 do not contain filler 3b. In samples 1-5, the adhesiveness of resistive element 4 after resistive element 4 is fired at 950° C. is examined. Especially, the softening point of sample 2 of glass 3a is different from that of sample 3 by changing the composition and type of the alkali metal.

In samples 2-4 of chip resistors 501, resistive element 4 is not peeled off, and the adhesiveness between resistive element 4 and insulating substrate 1 is preferable. Here, the softening points of samples 2-4 of glass 3a constituting glass glaze layers 3 are 580° C., 630° C., and 760° C., respectively. In sample 1 of glass 3a having the softening point of 490° C., the liquid melt of glass 3a of glass glaze layer 3 flows on insulating substrate 1, and prevents glass glaze layer 3 from having a predetermined pattern. In sample 5 of glass 3a having the softening point of 840° C., resistive element 4 is peeled from insulating substrate 1 during the firing of resistive element 4.

Therefore, the softening point of glass 3a of glass glaze layer 3 ranges from 580° C. to 760° C. prevents glass glaze layer 3 from flowing and expanding beyond the original pattern. Thus, the adhesiveness between the glass glaze layer 3 and resistive element 4 is improved, and resistive element 4 is prevented from being peeled off from insulating substrate 1.

Furthermore, as discussed above, filler 3b contained in glass glaze layer 3 prevents from resistive element 4 from deforming. Filler 3b prevents a macro high-temperature viscosity of the entire of glass glaze layer 3 from excessively decreasing while keeping a micro high-temperature viscosity of glass glaze layer 3 low. As a result, the deformation of resistive element 4 can be suppressed.

In the embodiment, terms, such as "upper surface", indicating directions merely indicates relative directions determined only by a relative positional relationship between components, such as a substrate and a resistive element, of a chip resistor, and do not indicate absolute directions, such as a vertical direction.

REFERENCE MARKS IN THE DRAWINGS 1 insulating substrate
12, 22 electrode
3 glass glaze layer
3a glass
3b filler
4 resistive element

The invention claimed is:
1. A chip resistor comprising:
an insulating substrate made of alumina;
a pair of electrodes disposed on an upper surface of the insulating substrate;
a glass glaze layer made of glass and disposed on the upper surface of the insulating substrate; and
a resistive element disposed on an upper surface of the glass glaze layer and between the pair of electrodes,
wherein a softening point of the glass of the glass glaze layer ranges from 580° C. to 630° C.
2. The chip resistor according to claim 1, wherein the glass includes $SiO_2$—$B_2O_3$—$ZnO$—$R_2O$ based glass containing an alkali metal oxide $R_2O$.
3. The chip resistor according to claim 2, wherein the glass glaze layer contains filler made of alumina powder.

4. The chip resistor according to claim 1, wherein the glass glaze layer contains filler made of alumina powder.

5. The chip resistor according to claim 1, wherein the glass includes $SiO_2$—$B_2O_3$—$R_2O$ based glass containing alkali metal oxide $R_2O$.

6. A chip resistor comprising:
an insulating substrate made of alumina;
a pair of electrodes disposed on an upper surface of the insulating substrate;
a glass glaze layer made of glass and disposed on the upper surface of the insulating substrate, the glass including $SiO_2$—$B_2O_3$—$R_2O$ based glass containing alkali metal oxide $R_2O$; and
a resistive element disposed on an upper surface of the glass glaze layer and between the pair of electrodes,
wherein a softening point of the glass of the glass glaze layer ranges from 580° C. to 760° C.

7. The chip resistor according to claim 5, wherein the glass glaze layer contains filler made of alumina powder.

8. The chip resistor according to claim 6, wherein the glass glaze layer contains filler made of alumina powder.

* * * * *